US011638331B2

(12) United States Patent
Wilson et al.

(10) Patent No.: US 11,638,331 B2
(45) Date of Patent: Apr. 25, 2023

(54) MULTI-FREQUENCY CONTROLLERS FOR INDUCTIVE HEATING AND ASSOCIATED SYSTEMS AND METHODS

(71) Applicant: KONTAK LLC, Redmond, WA (US)

(72) Inventors: Damien Wilson, Redmond, WA (US); David O'Connor, North Bend, WA (US)

(73) Assignee: KONTAK LLC, Issaquah, WA (US)

( * ) Notice: Subject to any disclaimer, the term of this patent is extended or adjusted under 35 U.S.C. 154(b) by 752 days.

(21) Appl. No.: 16/424,988

(22) Filed: May 29, 2019

(65) Prior Publication Data
US 2020/0022226 A1    Jan. 16, 2020

Related U.S. Application Data

(60) Provisional application No. 62/677,649, filed on May 29, 2018.

(51) Int. Cl.
*H05B 6/06* (2006.01)
*H05B 1/02* (2006.01)
(Continued)

(52) U.S. Cl.
CPC .................. *H05B 6/06* (2013.01); *G01K 1/14* (2013.01); *H05B 1/0297* (2013.01); *H05B 6/36* (2013.01)

(58) Field of Classification Search
CPC ........ G01K 1/14; G01K 13/00; G01K 13/005; H05B 1/0297; H05B 6/06; H05B 6/36; H05B 6/108; H05B 6/44
See application file for complete search history.

(56) References Cited

U.S. PATENT DOCUMENTS 3,972,372 A    8/1976  Fisher et al.
4,105,455 A    8/1978  Nagano et al.
(Continued)

FOREIGN PATENT DOCUMENTS

JP    2006-248814    9/2006
JP    2006-293079    10/2006
(Continued)

OTHER PUBLICATIONS

International Search Report and Written Opinion issued in PCT/US2018/034959 dated Feb. 7, 2019.
(Continued)

*Primary Examiner* — Ibrahime A Abraham
*Assistant Examiner* — Joe E Mills, Jr.
(74) *Attorney, Agent, or Firm* — Perkins Coie LLP

(57) ABSTRACT

The present technology is directed to multi-frequency controllers for inductive heating and associated systems and methods. The systems can be configured to precisely heat a module via a coil to a target temperature using oscillating, pulsed electrical signals associated with unique frequencies and/or capacitance values. Each unique frequency can correspond to heating the module to a particular depth, relative to an outer surface of the module. A first pulsed electrical signal having a first frequency can heat the module to a first depth, and a second pulsed electrical signal having a second frequency can heat the module to a second depth different than the first depth. The system can include a thermal sensor for measuring a temperature associated with at least one of the module or a fluid associated with the module. Based on the temperature, the system can adjust signal delivery parameters of the first and/or second electrical signals.

20 Claims, 5 Drawing Sheets

(51) Int. Cl.
   *H05B 6/36* (2006.01)
   *G01K 1/14* (2021.01)

(56) References Cited

U.S. PATENT DOCUMENTS

| | | |
|---|---|---|
| 4,237,111 A | 12/1980 | Wallevik et al. |
| 4,716,064 A | 12/1987 | Benander et al. |
| 4,729,891 A | 3/1988 | Kulkarni |
| 4,921,531 A | 5/1990 | Nagle et al. |
| 4,952,539 A | 8/1990 | Melas et al. |
| 5,075,090 A | 12/1991 | Lewis et al. |
| 5,110,996 A | 5/1992 | Edwards |
| 5,152,048 A | 10/1992 | Nebe et al. |
| 5,200,145 A | 4/1993 | Kear et al. |
| 5,240,682 A | 8/1993 | Whittenberger et al. |
| 5,321,896 A | 6/1994 | Raddatz et al. |
| 5,325,601 A | 7/1994 | Raddatz et al. |
| 5,350,003 A | 9/1994 | Fareed et al. |
| 5,423,372 A | 6/1995 | Kearney |
| 5,443,727 A | 8/1995 | Gagnon |
| 5,651,906 A | 7/1997 | Whittenberger et al. |
| 5,737,839 A | 4/1998 | Whittenberger et al. |
| 5,781,289 A | 7/1998 | Bussiere et al. |
| 5,820,835 A | 10/1998 | Whittenberger et al. |
| 5,846,495 A | 12/1998 | Whittenberger et al. |
| 5,847,353 A | 12/1998 | Surma et al. |
| 5,878,752 A | 3/1999 | Morgan et al. |
| 5,958,273 A | 9/1999 | Koch et al. |
| 6,001,204 A | 12/1999 | Haelg et al. |
| 6,018,471 A | 1/2000 | Surma et al. |
| 6,066,825 A | 5/2000 | Surma et al. |
| 6,074,447 A | 6/2000 | Jensen |
| 6,086,792 A | 7/2000 | Reid et al. |
| 6,215,678 B1 | 4/2001 | Titus |
| 6,261,679 B1 | 7/2001 | Qin et al. |
| 6,315,972 B1 | 11/2001 | Koch et al. |
| 6,383,706 B1 | 5/2002 | Tirado et al. |
| 6,488,838 B1 | 12/2002 | Fitzgerald et al. |
| 6,509,555 B1 | 1/2003 | Riess et al. |
| 6,603,054 B2 | 8/2003 | Qin et al. |
| 6,624,337 B1 | 9/2003 | Lundgren et al. |
| 6,630,113 B1 | 10/2003 | Surma |
| 6,639,197 B2 | 10/2003 | Riess et al. |
| 6,639,198 B2 | 10/2003 | Riess et al. |
| 6,689,252 B1 | 2/2004 | Shamouilian et al. |
| 6,710,314 B2 | 3/2004 | Riess et al. |
| 6,726,962 B1 | 4/2004 | Loszewski |
| 6,803,550 B2 | 10/2004 | Crowe et al. |
| 6,830,822 B2 | 12/2004 | Yadav |
| 6,849,109 B2 | 2/2005 | Yadav et al. |
| 6,849,837 B2 | 2/2005 | Riess et al. |
| 6,858,302 B2 | 2/2005 | Loszewski |
| 6,858,521 B2 | 2/2005 | Jin |
| 6,926,949 B1 | 8/2005 | Haelg et al. |
| 7,033,650 B2 | 4/2006 | Tang et al. |
| 7,070,743 B2 | 7/2006 | Fallon et al. |
| 7,168,534 B2 | 1/2007 | Messier |
| 7,185,659 B2 | 3/2007 | Sharpe |
| 7,186,396 B2 | 3/2007 | Naeemi et al. |
| 7,205,513 B2 | 4/2007 | Domoto et al. |
| 7,233,101 B2 | 6/2007 | Jin |
| 7,323,666 B2 | 1/2008 | Sharma et al. |
| 7,341,285 B2 | 3/2008 | McPherson |
| 7,351,395 B1 | 4/2008 | Wilhelm et al. |
| 7,361,207 B1 | 4/2008 | Filippov et al. |
| 7,365,289 B2 | 4/2008 | Darsey et al. |
| 7,387,673 B2 | 6/2008 | Yadav et al. |
| 7,390,360 B2 | 6/2008 | Shenai et al. |
| 7,413,793 B2 | 8/2008 | Lewis et al. |
| 7,473,873 B2 | 1/2009 | Darsey et al. |
| 7,517,829 B2 | 4/2009 | Warlimont et al. |
| 7,559,494 B1 | 7/2009 | Yadav et al. |
| 7,569,624 B2 | 8/2009 | Sebald et al. |
| 7,655,703 B2 | 2/2010 | Batdorf |
| 7,713,350 B2 | 5/2010 | Yadav |
| 7,745,355 B2 | 6/2010 | Sharma et al. |
| 7,776,383 B2 | 8/2010 | Yadav et al. |
| 7,794,797 B2 | 9/2010 | Vasenkov |
| 7,816,006 B2 | 10/2010 | Yadav et al. |
| 7,816,415 B2 | 10/2010 | Quapp et al. |
| 7,827,822 B2 | 11/2010 | Weinhold et al. |
| 7,863,522 B2 | 1/2011 | Paquette et al. |
| 7,866,386 B2 | 1/2011 | Beer et al. |
| 7,866,388 B2 | 1/2011 | Bravo |
| 7,931,784 B2 | 4/2011 | Medoff |
| 7,932,065 B2 | 4/2011 | Medoff |
| 7,955,508 B2 | 6/2011 | Flynn et al. |
| 7,976,692 B2 | 7/2011 | Zhang et al. |
| 8,011,451 B2 | 9/2011 | Macdonald |
| 8,017,892 B2 | 9/2011 | Darsey et al. |
| 8,057,666 B2 | 11/2011 | Flynn et al. |
| 8,080,735 B2 | 12/2011 | Biscoglio et al. |
| 8,083,906 B2 | 12/2011 | Medoff |
| 8,092,558 B2 | 1/2012 | O'Connor et al. |
| 8,113,272 B2 | 2/2012 | Vinegar |
| 8,142,620 B2 | 3/2012 | Medoff |
| 8,146,661 B2 | 4/2012 | Harvey, III et al. |
| 8,146,669 B2 | 4/2012 | Mason |
| 8,151,907 B2 | 4/2012 | Macdonald |
| 8,153,942 B2 | 4/2012 | Biris et al. |
| 8,158,818 B2 | 4/2012 | Frey et al. |
| 8,162,059 B2 | 4/2012 | Bass et al. |
| 8,162,405 B2 | 4/2012 | Burns et al. |
| 8,168,038 B2 | 5/2012 | Medoff |
| 8,172,335 B2 | 5/2012 | Burns et al. |
| 8,177,305 B2 | 5/2012 | Burns et al. |
| 8,192,809 B2 | 6/2012 | Basu et al. |
| 8,196,658 B2 | 6/2012 | Uwechue et al. |
| 8,197,889 B2 | 6/2012 | Veith et al. |
| 8,212,087 B2 | 7/2012 | Medoff |
| 8,220,539 B2 | 7/2012 | Nguyen et al. |
| 8,236,535 B2 | 8/2012 | Masterman et al. |
| 8,240,774 B2 | 8/2012 | Vinegar |
| 8,256,512 B2 | 9/2012 | Stanecki |
| 8,261,832 B2 | 9/2012 | Ryan |
| 8,267,170 B2 | 9/2012 | Fowler et al. |
| 8,267,185 B2 | 9/2012 | Ocampos et al. |
| 8,272,455 B2 | 9/2012 | Mansure et al. |
| 8,276,636 B2 | 10/2012 | McPherson |
| 8,276,661 B2 | 10/2012 | Vinegar et al. |
| 8,281,861 B2 | 10/2012 | Nguyen et al. |
| 8,292,987 B2 | 10/2012 | Gonze et al. |
| 8,327,932 B2 | 12/2012 | Karanikas et al. |
| 8,329,936 B2 | 12/2012 | Coutable et al. |
| 8,353,347 B2 | 1/2013 | Mason |
| 8,357,883 B2 | 1/2013 | Sato |
| 8,362,407 B2 | 1/2013 | Filippov et al. |
| 8,372,327 B2 | 2/2013 | Masten et al. |
| 8,382,970 B2 | 2/2013 | Zhang et al. |
| 8,414,664 B2 | 4/2013 | Sadowsky et al. |
| 8,434,555 B2 | 5/2013 | Jaiswal et al. |
| 8,448,707 B2 | 5/2013 | Bass |
| 8,454,803 B2 | 6/2013 | Medoff |
| 8,455,580 B2 | 6/2013 | Sengupta et al. |
| 8,459,032 B2 | 6/2013 | Naeemi et al. |
| 8,475,760 B2 | 7/2013 | Sinkko et al. |
| 8,492,128 B2 | 7/2013 | Medoff |
| 8,497,366 B2 | 7/2013 | Medoff |
| 8,518,683 B2 | 8/2013 | Masterman et al. |
| 8,529,738 B2 | 9/2013 | O'Connor et al. |
| 8,535,381 B2 | 9/2013 | O'Connor et al. |
| 8,536,497 B2 | 9/2013 | Kim |
| 8,562,078 B2 | 10/2013 | Burns et al. |
| 8,568,507 B2 | 10/2013 | Edlinger |
| 8,569,526 B2 | 10/2013 | Ceylan et al. |
| 8,576,016 B2 | 11/2013 | Czimmek |
| 8,576,017 B2 | 11/2013 | Czimmek |
| 8,597,921 B2 | 12/2013 | Medoff |
| 8,603,787 B2 | 12/2013 | Medoff |
| 8,609,384 B2 | 12/2013 | Medoff |
| 8,636,323 B2 | 1/2014 | Macdonald et al. |
| 8,637,284 B2 | 1/2014 | Medoff |
| 8,647,401 B2 | 2/2014 | Self et al. |
| 8,680,399 B2 | 3/2014 | Eaton |

(56) References Cited

U.S. PATENT DOCUMENTS

| | | |
|---|---|---|
| 8,708,691 B2 | 4/2014 | Dykstra et al. |
| 8,709,768 B2 | 4/2014 | Medoff |
| 8,709,771 B2 | 4/2014 | Masterman et al. |
| 8,716,537 B2 | 5/2014 | Medoff |
| 8,728,779 B2 | 5/2014 | Medoff |
| 8,734,643 B2 | 5/2014 | Foret |
| 8,734,654 B2 | 5/2014 | Foret |
| 8,747,624 B2 | 6/2014 | Medoff |
| 8,752,904 B2 | 6/2014 | Burns et al. |
| 8,763,231 B2 | 7/2014 | Lewandowski et al. |
| 8,764,948 B2 | 7/2014 | Medoff |
| 8,764,978 B2 | 7/2014 | Foret |
| 8,771,480 B2 | 7/2014 | Medoff |
| 8,835,142 B2 | 9/2014 | Medoff |
| 8,841,101 B2 | 9/2014 | Medoff |
| 8,846,356 B2 | 9/2014 | Medoff |
| 8,849,142 B2 | 9/2014 | Iwasaki et al. |
| 8,851,170 B2 | 10/2014 | Colmenares et al. |
| 8,852,896 B2 | 10/2014 | Medoff |
| 8,852,905 B2 | 10/2014 | Medoff |
| 8,871,964 B2 | 10/2014 | Wichelhaus et al. |
| 8,876,923 B2 | 11/2014 | Cherrillo et al. |
| 8,877,472 B2 | 11/2014 | Medoff |
| 8,881,806 B2 | 11/2014 | Vinegar et al. |
| 8,900,839 B2 | 12/2014 | Medoff |
| 8,946,489 B2 | 2/2015 | Medoff |
| 8,980,602 B2 | 3/2015 | Medoff |
| 8,999,030 B2 | 4/2015 | Schendel et al. |
| 9,010,428 B2 | 4/2015 | Mazyar et al. |
| 9,022,118 B2 | 5/2015 | Burns |
| 9,023,183 B2 | 5/2015 | Medoff |
| 9,023,628 B2 | 5/2015 | Medoff |
| 9,044,900 B2 | 6/2015 | McPherson |
| 9,051,829 B2 | 6/2015 | Vinegar et al. |
| 9,058,918 B2 | 6/2015 | Eaton et al. |
| 9,062,328 B2 | 6/2015 | Medoff |
| 9,074,566 B2 | 7/2015 | Czimmek et al. |
| 9,078,461 B2 | 7/2015 | Medoff |
| 9,089,628 B2 | 7/2015 | Loh et al. |
| 9,101,880 B2 | 8/2015 | Geus et al. |
| 9,109,241 B2 | 8/2015 | Masterman et al. |
| 9,129,728 B2 | 9/2015 | Macdonald et al. |
| 9,132,407 B1 | 9/2015 | Medoff |
| 9,138,715 B2 | 9/2015 | Medoff |
| 9,163,114 B2 | 10/2015 | Budhlall et al. |
| 9,175,137 B2 | 11/2015 | Sahagun et al. |
| 9,186,646 B2 | 11/2015 | Medoff |
| 9,187,769 B1 | 11/2015 | Medoff |
| 9,208,923 B2 | 12/2015 | Smith et al. |
| 9,212,591 B2 | 12/2015 | Cosby et al. |
| 9,278,896 B1 | 3/2016 | Medoff |
| 9,283,537 B2 | 3/2016 | Medoff |
| 9,285,403 B2 | 3/2016 | Czimmek |
| 9,290,780 B2 | 3/2016 | Masterman et al. |
| 9,309,545 B2 | 4/2016 | Medoff |
| 9,334,843 B2 | 5/2016 | Cosby et al. |
| 9,347,661 B2 | 5/2016 | Medoff |
| 9,352,294 B1 | 5/2016 | Medoff |
| 9,400,439 B2 | 7/2016 | Takahashi et al. |
| 9,404,005 B2 | 8/2016 | Vaughan et al. |
| 9,409,140 B2 | 8/2016 | Medoff |
| 9,421,523 B2 | 8/2016 | Naeemi et al. |
| 9,446,371 B2 | 9/2016 | Foret |
| 9,475,698 B2 | 10/2016 | Wood et al. |
| 9,493,796 B2 | 11/2016 | Masterman et al. |
| 9,517,444 B2 | 12/2016 | Medoff |
| 9,528,322 B2 | 12/2016 | Macdonald |
| 9,587,258 B2 | 3/2017 | Medoff |
| 9,605,287 B2 | 3/2017 | Medoff |
| 9,605,288 B2 | 3/2017 | Medoff |
| 9,607,732 B2 | 3/2017 | Kjellqvist et al. |
| 9,618,947 B2 | 4/2017 | Czimmek |
| 9,623,393 B2 | 4/2017 | Bore et al. |
| 9,657,622 B2 | 5/2017 | Douglas et al. |
| 9,676,491 B2 | 6/2017 | Delgado et al. |
| 9,695,280 B2 | 7/2017 | Zhang et al. |
| 9,700,868 B2 | 7/2017 | Medoff |
| 9,745,604 B2 | 8/2017 | Medoff |
| 9,745,609 B2 | 8/2017 | Medoff |
| 9,758,638 B2 | 9/2017 | Cree |
| 9,803,222 B2 | 10/2017 | Medoff |
| 2001/0024716 A1 | 9/2001 | Qin et al. |
| 2002/0102353 A1 | 8/2002 | Tang et al. |
| 2003/0071033 A1 | 4/2003 | Riess et al. |
| 2003/0075540 A1 | 4/2003 | Riess et al. |
| 2003/0121909 A1 | 7/2003 | Riess et al. |
| 2003/0175196 A1 | 9/2003 | Fallon et al. |
| 2003/0207112 A1 | 11/2003 | Yadav |
| 2003/0212179 A1 | 11/2003 | Yadav et al. |
| 2003/0220039 A1 | 11/2003 | Qin et al. |
| 2004/0050839 A1 | 3/2004 | Riess et al. |
| 2004/0076810 A1 | 4/2004 | Blain et al. |
| 2004/0127012 A1 | 7/2004 | Jin |
| 2004/0129555 A1 | 7/2004 | Flock et al. |
| 2004/0139888 A1 | 7/2004 | Yadav et al. |
| 2004/0149297 A1 | 8/2004 | Sharpe |
| 2004/0149737 A1 | 8/2004 | Crowe et al. |
| 2004/0150311 A1 | 8/2004 | Jin et al. |
| 2004/0155096 A1 | 8/2004 | Falkenberg et al. |
| 2004/0157002 A1 | 8/2004 | Bons et al. |
| 2004/0170820 A1 | 9/2004 | Yadav et al. |
| 2004/0180203 A1 | 9/2004 | Yadav et al. |
| 2004/0185384 A1 | 9/2004 | Suganuma et al. |
| 2004/0199039 A1 | 10/2004 | Chadwell et al. |
| 2004/0229295 A1 | 11/2004 | Flock et al. |
| 2004/0249037 A1 | 12/2004 | Pridohl et al. |
| 2005/0013767 A1 | 1/2005 | Bagzis |
| 2005/0107251 A1 | 5/2005 | Warlimont et al. |
| 2005/0121437 A1 | 6/2005 | Sharma et al. |
| 2005/0208218 A1 | 9/2005 | Becker et al. |
| 2005/0212297 A1 | 9/2005 | McPherson |
| 2005/0255370 A1 | 11/2005 | Figueroa et al. |
| 2005/0287297 A1 | 12/2005 | Darsey et al. |
| 2006/0051281 A1 | 3/2006 | Taylor et al. |
| 2006/0068080 A1 | 3/2006 | Yadav et al. |
| 2006/0115595 A1 | 6/2006 | Woelk et al. |
| 2006/0289481 A1 | 6/2006 | Woelk et al. |
| 2007/0003476 A1 | 1/2007 | Ratner et al. |
| 2007/0068933 A1 | 3/2007 | Darsey et al. |
| 2007/0110985 A1 | 5/2007 | Lewis et al. |
| 2007/0204512 A1 | 9/2007 | Self et al. |
| 2007/0210075 A1 | 9/2007 | Self et al. |
| 2008/0035682 A1 | 2/2008 | Filippov et al. |
| 2008/0045408 A1 | 2/2008 | Buarque |
| 2008/0045412 A1 | 2/2008 | Buarque |
| 2008/0124994 A1 | 5/2008 | Sharma et al. |
| 2008/0142367 A1 | 6/2008 | West et al. |
| 2008/0149363 A1 | 6/2008 | Cieslinski et al. |
| 2008/0156228 A1 | 7/2008 | Yadav |
| 2008/0182027 A1 | 7/2008 | Vasenkov |
| 2008/0182911 A1 | 7/2008 | Batdorf |
| 2008/0187907 A1 | 8/2008 | Nackos et al. |
| 2008/0197534 A1 | 8/2008 | Ichikawa |
| 2008/0223851 A1 | 9/2008 | Darsey et al. |
| 2008/0243049 A1 | 10/2008 | Hardy |
| 2008/0264330 A1 | 10/2008 | Darsey et al. |
| 2008/0274280 A1 | 11/2008 | Darsey et al. |
| 2008/0294089 A1 | 11/2008 | Hardy |
| 2008/0311045 A1 | 12/2008 | Hardy |
| 2008/0319375 A1 | 12/2008 | Hardy |
| 2009/0011180 A1 | 1/2009 | Ichikawa |
| 2009/0014121 A1 | 1/2009 | McPherson |
| 2009/0019768 A1 | 1/2009 | Toseland et al. |
| 2009/0023821 A1 | 1/2009 | Batdorf et al. |
| 2009/0025425 A1 | 1/2009 | Yuhas et al. |
| 2009/0074630 A1 | 3/2009 | Gonze et al. |
| 2009/0074905 A1 | 3/2009 | Matsen et al. |
| 2009/0093886 A1 | 4/2009 | Nelson et al. |
| 2009/0184281 A1 | 7/2009 | Yadav et al. |
| 2009/0185964 A1 | 7/2009 | Nelson et al. |
| 2009/0189617 A1 | 7/2009 | Burns et al. |
| 2009/0194269 A1 | 8/2009 | Vinegar |
| 2009/0194282 A1 | 8/2009 | Beer et al. |
| 2009/0194286 A1 | 8/2009 | Mason |

(56) References Cited

U.S. PATENT DOCUMENTS

| | | |
|---|---|---|
| 2009/0194287 A1 | 8/2009 | Carroll et al. |
| 2009/0194329 A1 | 8/2009 | Mansure et al. |
| 2009/0194333 A1 | 8/2009 | Macdonald |
| 2009/0194524 A1 | 8/2009 | Kim |
| 2009/0200022 A1 | 8/2009 | Harvey, III et al. |
| 2009/0200023 A1 | 8/2009 | Vinegar et al. |
| 2009/0200025 A1 | 8/2009 | Bravo |
| 2009/0200031 A1 | 8/2009 | Uwechue et al. |
| 2009/0200290 A1 | 8/2009 | Cardinal et al. |
| 2009/0200854 A1 | 8/2009 | Vinegar |
| 2009/0208684 A1 | 8/2009 | Dunleavy et al. |
| 2009/0233349 A1 | 9/2009 | Veith et al. |
| 2009/0236329 A1 | 9/2009 | Sato |
| 2009/0257945 A1 | 10/2009 | Biris et al. |
| 2009/0260823 A1 | 10/2009 | Macdonald et al. |
| 2009/0260824 A1 | 10/2009 | Burns et al. |
| 2009/0272526 A1 | 11/2009 | Burns et al. |
| 2009/0272533 A1 | 11/2009 | Burns et al. |
| 2009/0272535 A1 | 11/2009 | Burns et al. |
| 2009/0272536 A1 | 11/2009 | Burns et al. |
| 2009/0272578 A1 | 11/2009 | Macdonald |
| 2009/0286295 A1 | 11/2009 | Masterman et al. |
| 2009/0311445 A1 | 12/2009 | Vasenkov |
| 2010/0021748 A1 | 1/2010 | Qi et al. |
| 2010/0032308 A1 | 2/2010 | Zhang et al. |
| 2010/0055349 A1 | 3/2010 | Basu et al. |
| 2010/0069656 A1 | 3/2010 | Baumann et al. |
| 2010/0071903 A1 | 3/2010 | Macdonald et al. |
| 2010/0071904 A1 | 3/2010 | Burns et al. |
| 2010/0072429 A1 | 3/2010 | Rajala et al. |
| 2010/0087687 A1 | 4/2010 | Medoff |
| 2010/0089584 A1 | 4/2010 | Burns |
| 2010/0089586 A1 | 4/2010 | Stanecki |
| 2010/0096137 A1 | 4/2010 | Nguyen et al. |
| 2010/0101783 A1 | 4/2010 | Nguyen et al. |
| 2010/0101784 A1 | 4/2010 | Nguyen et al. |
| 2010/0101794 A1 | 4/2010 | Ryan |
| 2010/0101823 A1 | 4/2010 | Eaton |
| 2010/0108310 A1 | 5/2010 | Fowler et al. |
| 2010/0108379 A1 | 5/2010 | Macdonald et al. |
| 2010/0108567 A1 | 5/2010 | Medoff |
| 2010/0112242 A1 | 5/2010 | Medoff |
| 2010/0124583 A1 | 5/2010 | Medoff |
| 2010/0147521 A1 | 6/2010 | Vinegar et al. |
| 2010/0147522 A1 | 6/2010 | Vinegar et al. |
| 2010/0155070 A1 | 6/2010 | Nair et al. |
| 2010/0179315 A1 | 7/2010 | Medoff |
| 2010/0206570 A1 | 8/2010 | Cao et al. |
| 2010/0209056 A1 | 8/2010 | Chaudhary et al. |
| 2010/0224368 A1 | 9/2010 | Mason |
| 2010/0249404 A1 | 9/2010 | Friese |
| 2010/0258265 A1 | 10/2010 | Pollard et al. |
| 2010/0258290 A1 | 10/2010 | Bass |
| 2010/0258291 A1 | 10/2010 | Harley et al. |
| 2010/0258309 A1 | 10/2010 | Colmenares et al. |
| 2010/0304439 A1 | 12/2010 | Medoff |
| 2010/0304440 A1 | 12/2010 | Medoff |
| 2010/0316882 A1 | 12/2010 | Truesdale et al. |
| 2011/0008246 A1 | 1/2011 | Filippov et al. |
| 2011/0020214 A1 | 1/2011 | Nelson et al. |
| 2011/0027837 A1 | 2/2011 | Medoff |
| 2011/0039317 A1 | 2/2011 | Medoff |
| 2011/0042084 A1 | 2/2011 | Bos et al. |
| 2011/0042201 A1 | 2/2011 | Von Gutfeld et al. |
| 2011/0052460 A1 | 3/2011 | Filippov et al. |
| 2011/0056124 A1 | 3/2011 | Sadowsky et al. |
| 2011/0067576 A1 | 3/2011 | Gaeta et al. |
| 2011/0081335 A1 | 4/2011 | Medoff |
| 2011/0081336 A1 | 4/2011 | Medoff |
| 2011/0094772 A1 | 4/2011 | Gross et al. |
| 2011/0111456 A1 | 5/2011 | Medoff |
| 2011/0147041 A1 | 6/2011 | Caronia et al. |
| 2011/0147639 A1 | 6/2011 | Gowell et al. |
| 2011/0155559 A1 | 6/2011 | Medoff |
| 2011/0179907 A1 | 7/2011 | Edlinger |
| 2011/0209897 A1 | 9/2011 | Denton et al. |
| 2011/0232169 A1 | 9/2011 | Cherrillo et al. |
| 2011/0271588 A1 | 11/2011 | Jader et al. |
| 2011/0272082 A1 | 11/2011 | Dunleavy et al. |
| 2011/0297623 A1 | 12/2011 | Foret |
| 2011/0300029 A1 | 12/2011 | Foret |
| 2011/0301363 A1 | 12/2011 | Friese |
| 2011/0303532 A1 | 12/2011 | Foret |
| 2012/0017422 A1 | 1/2012 | Lewandowski et al. |
| 2012/0039781 A1 | 2/2012 | Geus et al. |
| 2012/0065307 A1 | 3/2012 | Brown et al. |
| 2012/0077247 A1 | 3/2012 | Medoff |
| 2012/0094355 A1 | 4/2012 | Medoff |
| 2012/0094358 A1 | 4/2012 | Medoff |
| 2012/0142065 A1 | 6/2012 | Medoff |
| 2012/0142068 A1 | 6/2012 | Medoff |
| 2012/0202994 A1 | 8/2012 | Wichelhaus et al. |
| 2012/0203021 A1 | 8/2012 | Coutable et al. |
| 2012/0215023 A1 | 8/2012 | Wichelhaus et al. |
| 2012/0003704 A1 | 9/2012 | Medoff |
| 2012/0231197 A1 | 9/2012 | Mitchell |
| 2012/0237984 A1 | 9/2012 | Medoff |
| 2012/0267359 A1 | 10/2012 | Czimmek |
| 2012/0267448 A1 | 10/2012 | Czimmek et al. |
| 2012/0268219 A1 | 10/2012 | Czimmek |
| 2012/0277329 A1 | 11/2012 | Galloway |
| 2012/0283449 A1 | 11/2012 | Friese et al. |
| 2012/0289734 A1 | 11/2012 | Kaufmann et al. |
| 2012/0291343 A1 | 11/2012 | Jader et al. |
| 2012/0309060 A1 | 12/2012 | Medoff |
| 2012/0309100 A1 | 12/2012 | Oen et al. |
| 2012/0315060 A1 | 12/2012 | Iwasaki et al. |
| 2012/0316376 A1 | 12/2012 | Medoff |
| 2013/0011895 A1 | 1/2013 | Masterman et al. |
| 2013/0026752 A1 | 1/2013 | McPherson |
| 2013/0056209 A1 | 3/2013 | Mazyar et al. |
| 2013/0101326 A1 | 4/2013 | Zhang et al. |
| 2013/0101983 A1 | 4/2013 | Chandra |
| 2013/0102029 A1 | 4/2013 | Medoff |
| 2013/0122764 A1 | 5/2013 | Matsen et al. |
| 2013/0150533 A1 | 6/2013 | Budhlall et al. |
| 2013/0164818 A9 | 6/2013 | Medoff |
| 2013/0175068 A1 | 7/2013 | Stevens et al. |
| 2013/0183735 A9 | 7/2013 | Medoff |
| 2013/0196386 A1 | 8/2013 | Medoff |
| 2013/0216520 A9 | 8/2013 | Medoff |
| 2013/0225714 A1 | 8/2013 | Medoff |
| 2013/0261340 A1 | 10/2013 | Medoff |
| 2013/0266556 A9 | 10/2013 | Medoff |
| 2013/0273612 A1 | 10/2013 | Medoff |
| 2013/0288307 A1 | 10/2013 | Medoff |
| 2013/0295624 A1 | 11/2013 | Masterman et al. |
| 2013/0303810 A1 | 11/2013 | Handerek |
| 2013/0315028 A1 | 11/2013 | Smith |
| 2014/0030763 A1 | 1/2014 | Medoff |
| 2014/0030768 A1 | 1/2014 | Medoff |
| 2014/0033777 A1 | 2/2014 | Schendel et al. |
| 2014/0147907 A1 | 5/2014 | Masterman et al. |
| 2014/0148568 A1 | 5/2014 | Mabry et al. |
| 2014/0154749 A1 | 6/2014 | Medoff |
| 2014/0182272 A1 | 7/2014 | Hornby et al. |
| 2014/0182366 A1 | 7/2014 | Cosby et al. |
| 2014/0182563 A1 | 7/2014 | Czimmek |
| 2014/0183185 A1 | 7/2014 | Czimmek |
| 2014/0187416 A1 | 7/2014 | Naeemi et al. |
| 2014/0197154 A1 | 7/2014 | Czimmek |
| 2014/0197854 A1 | 7/2014 | Czimmek |
| 2014/0329091 A1 | 11/2014 | Koh et al. |
| 2014/0329280 A1 | 11/2014 | Medoff |
| 2014/0329961 A1 | 11/2014 | Smith et al. |
| 2014/0334999 A1 | 11/2014 | Foret |
| 2014/0348982 A1 | 11/2014 | Medoff |
| 2014/0374237 A1 | 12/2014 | Medoff |
| 2015/0004669 A1 | 1/2015 | Medoff |
| 2015/0021094 A1 | 1/2015 | Macdonald |
| 2015/0044122 A1 | 2/2015 | Zikeli et al. |
| 2015/0075839 A1 | 3/2015 | Sun et al. |
| 2015/0104843 A1 | 4/2015 | Medoff |
| 2015/0122243 A1 | 5/2015 | Galloway |

(56) References Cited

U.S. PATENT DOCUMENTS

| | | |
|---|---|---|
| 2015/0122529 A1 | 5/2015 | Kjellqvist et al. |
| 2015/0122802 A1 | 5/2015 | Zikeli et al. |
| 2015/0152344 A1 | 6/2015 | Gueh |
| 2015/0183641 A1 | 7/2015 | Wood et al. |
| 2015/0184090 A1 | 7/2015 | Ni |
| 2015/0203701 A1 | 7/2015 | Sun et al. |
| 2015/0211730 A1 | 7/2015 | Medoff |
| 2015/0217260 A1 | 8/2015 | Medoff |
| 2015/0234304 A1 | 8/2015 | Takahashi et al. |
| 2015/0265997 A1 | 9/2015 | Medoff |
| 2015/0267036 A1 | 9/2015 | Cree |
| 2015/0275108 A1 | 10/2015 | Gueh |
| 2015/0299494 A1 | 10/2015 | Sun et al. |
| 2015/0329879 A1 | 11/2015 | Masterman et al. |
| 2015/0342224 A1 | 12/2015 | Medoff |
| 2015/0344143 A1 | 12/2015 | Delgado, Jr. et al. |
| 2015/0344914 A1 | 12/2015 | Medoff |
| 2015/0353974 A1 | 12/2015 | Medoff |
| 2015/0354426 A1 | 12/2015 | Douglas et al. |
| 2015/0368762 A1 | 12/2015 | Dolan et al. |
| 2016/0009554 A1 | 1/2016 | Gueh |
| 2016/0024374 A1 | 1/2016 | Agrawal et al. |
| 2016/0032341 A1 | 2/2016 | Medoff |
| 2016/0033492 A1 | 2/2016 | Bentley |
| 2016/0038905 A1 | 2/2016 | Medoff |
| 2016/0038906 A1 | 2/2016 | Medoff |
| 2016/0061383 A1 | 3/2016 | Arlt et al. |
| 2016/0075953 A1 | 3/2016 | Maxwell et al. |
| 2016/0090614 A1 | 3/2016 | Medoff |
| 2016/0160240 A1 | 6/2016 | Masterman et al. |
| 2016/0165926 A1 | 6/2016 | Medoff |
| 2016/0167010 A1 | 6/2016 | Medoff |
| 2016/0225490 A1 | 8/2016 | Munro et al. |
| 2016/0237591 A1 | 8/2016 | Hanrath et al. |
| 2016/0251535 A1 | 9/2016 | Chaudhary |
| 2016/0257067 A1 | 9/2016 | Ganter et al. |
| 2016/0257783 A1 | 9/2016 | Zhang et al. |
| 2016/0265159 A1 | 9/2016 | Medoff |
| 2016/0281482 A1 | 9/2016 | Nguyen et al. |
| 2016/0289577 A1 | 10/2016 | Medoff |
| 2016/0289704 A1 | 10/2016 | Medoff |
| 2016/0289705 A1 | 10/2016 | Medoff |
| 2016/0289706 A1 | 10/2016 | Medoff |
| 2016/0289709 A1 | 10/2016 | Medoff |
| 2016/0289710 A1 | 10/2016 | Medoff |
| 2016/0293990 A1 | 10/2016 | Medoff |
| 2016/0298141 A1 | 10/2016 | Medoff |
| 2016/0298147 A1 | 10/2016 | Medoff |
| 2017/0000145 A1 | 1/2017 | Foret |
| 2017/0009060 A1 | 1/2017 | Sengupta et al. |
| 2017/0009061 A1 | 1/2017 | Sun et al. |
| 2017/0014763 A1 | 1/2017 | Douglas et al. |
| 2017/0014764 A1 | 1/2017 | Douglas et al. |
| 2017/0014765 A1 | 1/2017 | Douglas |
| 2017/0022062 A1 | 1/2017 | Perez |
| 2017/0022868 A1 | 1/2017 | Douglas |
| 2017/0079325 A1 | 3/2017 | Mironov |
| 2017/0080697 A1 | 3/2017 | Kusuura |
| 2017/0089304 A1 | 3/2017 | Dudar |
| 2017/0101312 A1 | 4/2017 | Mihailowitsch |
| 2017/0101528 A1 | 4/2017 | Sengupta |
| 2017/0121737 A1 | 5/2017 | Masterman |
| 2017/0128927 A1 | 5/2017 | Garcia |
| 2017/0130252 A1 | 5/2017 | Medoff |
| 2017/0145886 A1 | 5/2017 | Douglas |
| 2017/0152532 A1 | 6/2017 | Medoff |
| 2017/0158840 A1 | 6/2017 | Sun |
| 2017/0170477 A1 | 6/2017 | Fredrick |
| 2017/0183477 A1 | 6/2017 | Caronia |
| 2017/0190629 A1 | 7/2017 | Valette |
| 2017/0210892 A1 | 7/2017 | Caronia |
| 2017/0218816 A1 | 8/2017 | Douglas |
| 2017/0218823 A1 | 8/2017 | Douglas |
| 2017/0226907 A1 | 8/2017 | Douglas |
| 2017/0233546 A1 | 8/2017 | Cree |
| 2017/0252872 A1 | 9/2017 | Hartmann |
| 2017/0260328 A1 | 9/2017 | Zhang |
| 2017/0283258 A1 | 10/2017 | Fraunhofer |
| 2017/0321233 A1 | 11/2017 | Medoff |
| 2017/0334822 A1 | 11/2017 | Spohr |
| 2018/0187585 A1* | 7/2018 | Crawford .............. F01N 3/2013 |
| 2018/0192479 A1* | 7/2018 | Kwack ................... H05B 6/065 |

FOREIGN PATENT DOCUMENTS

| | | |
|---|---|---|
| JP | 2007-254233 | 10/2007 |
| JP | 2009-513327 | 4/2009 |
| JP | 2014073923 A | 4/2014 |
| JP | 2016138594 A | 8/2016 |
| JP | 6308006 B2 | 4/2018 |
| KR | 10-1151501 B1 | 7/2012 |
| WO | 2000038497 A2 | 7/2000 |
| WO | 2003078054 A1 | 9/2003 |
| WO | 2011053326 A1 | 5/2011 |
| WO | 2015061215 A2 | 4/2015 |
| WO | 2017036794 A1 | 3/2017 |

OTHER PUBLICATIONS

International Search Report and Written Opinion issued in PCT/US2019/034284 dated Sep. 20, 2019.
International Search Report and Written Opinion issued in PCT/US2019/034288 dated Sep. 23, 2019.

* cited by examiner

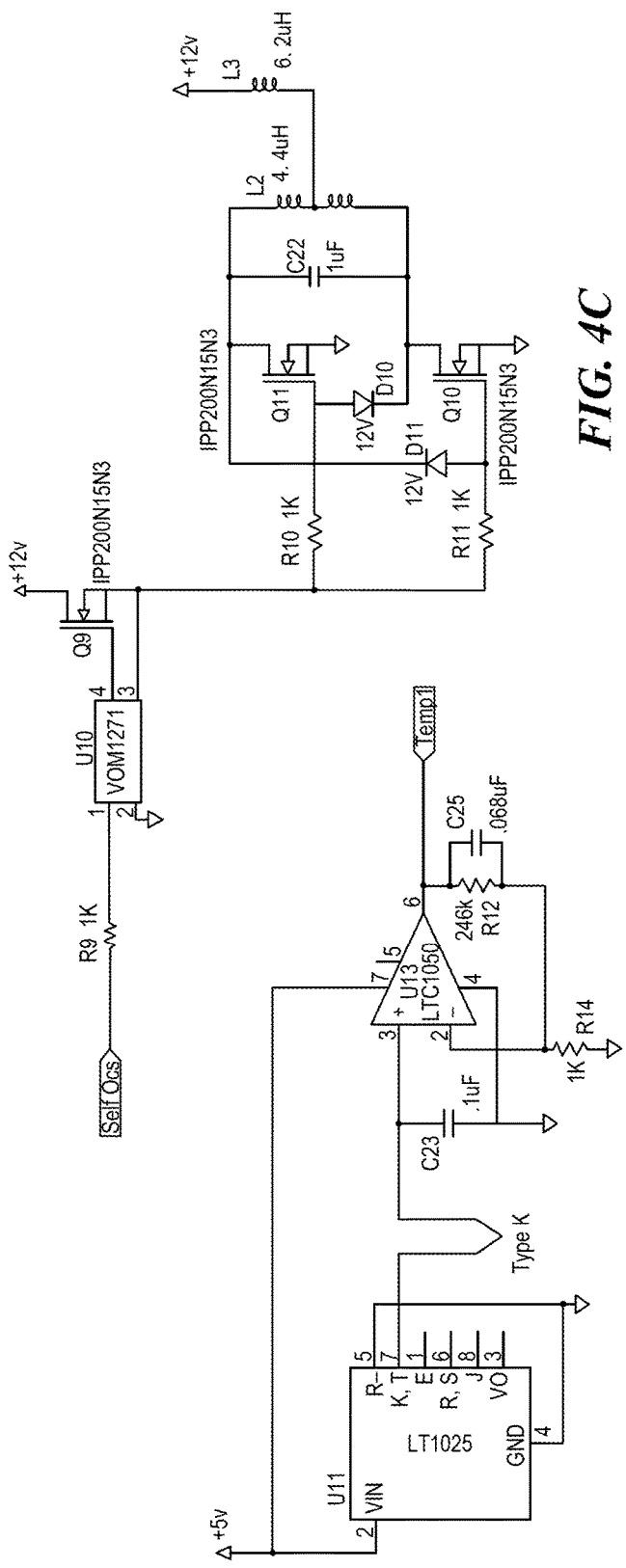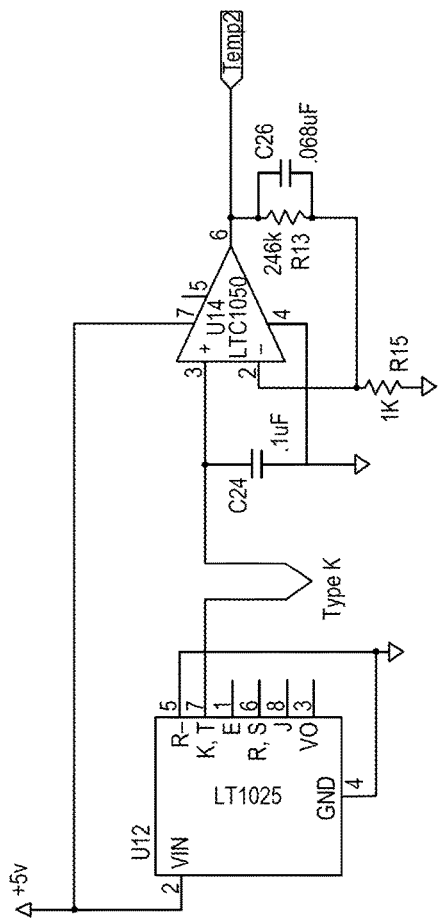
FIG. 4C
FIG. 4B
FIG. 4D

MULTI-FREQUENCY CONTROLLERS FOR INDUCTIVE HEATING AND ASSOCIATED SYSTEMS AND METHODS

CROSS-REFERENCE TO RELATED APPLICATIONS

The present application claims priority to Provisional Application No. 62/677,649 entitled "MULTI-FREQUENCY CONTROLLERS FOR INDUCTIVE HEATING AND ASSOCIATED SYSTEMS AND METHODS" filed on May 29, 2018, which is incorporated herein by reference in its entirety and made part of the present disclosure. The present application is related to co-pending U.S. Non-Provisional application Ser. No. 15/826,590 filed Nov. 29, 2017, titled "INDUCTIVELY HEATED MICROCHANNEL REACTOR"; U.S. Provisional No. (62/677,612), filed May 29, 2018, titled "MODULAR FUELING STATION"; U.S. Provisional No. (62/677,640), filed May 29, 2018, titled "SYSTEMS FOR REMOVING HYDROGEN FROM REGENERABLE LIQUID CARRIERS AND ASSOCIATED METHODS"; and U.S. Provisional No. (62/677,620), filed May 29, 2018, titled "DUAL BLADDER FUEL TANK". The disclosures of the referenced patent applications are considered part of the disclosure of the present application and are hereby incorporated by reference herein in their entirety and made part of the present disclosure.

TECHNICAL FIELD

The present technology is generally directed to multi-frequency controllers used for inductive heating. In some embodiments, the multi-frequency controllers are configured to precisely regulate temperature of a module by heating particular depths of the module.

BACKGROUND

Chemical reactions are commonly carried out in a chamber in which molecules are forced to interact to produce a desired chemical product. Precise heating ensures that desired products are produced at desired yields, concentrations, and purities. When the temperature is too high, unwanted chemical reactions may occur. When the temperature is too low, the desired chemical reactions may not occur. The input reactants generally react to produce the desired product within a constrained range of temperatures.

Similarly, some reactive molecules contained within a chamber are sensitive to temperatures, potentially reacting into undesirable products when the temperature is too high or too low.

Current heating and cooling designs are very inefficient because heat has to move from exterior heaters to channels deep within an interior of a chamber. Heat moves from hot outer surfaces to the cooler inner surfaces via conduction along the thin channel walls. This requires that heat on the outside channels be much higher than the desired heat on the inner channels. The range of temperatures may result in inefficient operation, and/or unintended or undesirable chemical decomposition. Maintaining a uniform temperature for the input reactants across an area in the chamber is important for chemical reaction efficiency.

Thus, an efficient system and method for controlling the heating within a chamber is needed.

SUMMARY

One inventive aspect is a system for heating a module (e.g., a container, receptacle, storage device, delivery device, reactor, or other module) via a coil to a target temperature using oscillating, pulsed electrical signals associated with unique frequencies and/or capacitance values. Each unique frequency can correspond to heating the module to a particular depth, relative to an outer surface of the module. For example, a first pulsed electrical signal having a first frequency can heat the module to a first depth, and a second pulsed electrical signal having a second frequency can heat the module to a second depth different than the first depth. The system can further include a thermal sensor for measuring a temperature associated with at least one of the module or a fluid associated with the module. Based on the measured temperature, the system can adjust signal delivery parameters of the first and/or second electrical signals.

Another aspect is a method for heating a module via an inductive coil to a target temperature using oscillating, pulsed electrical signals associated with unique frequencies and/or capacitance values. This method includes sending interleaving electrical signals to an inductor coil wrapped around a module. The electrical signals including a first electrical signal having a first duty cycle and a second electrical signal having a second duty cycle. The first electrical signal may cause a first set of capacitors to be electrically connected to the inductor coil and the module to be heated to a first depth relative to an outer surface of the module. The second electrical signal causes a second set of capacitors (different from the first set of capacitors) to be electrically connected to the inductor coil and the module to be heated to a second depth relative to the outer surface, the second depth being different than the first depth. A temperature signal from a thermal sensor, the temperature signal including a temperature of at least one of the module or a fluid entering or exiting the module is received. A signal delivery parameter of at least one of the first or second electrical signals is adjusted based at least in part on the received temperature signal.

These, and other aspects, are disclosed in the present document.

BRIEF DESCRIPTION OF THE DRAWINGS

The various embodiments are illustrated by way of example, and not by way of limitation, in the figures of the accompanying drawings. More particular descriptions and equally effective implementations are included in this disclosure.

FIGS. 4A-4D are schematic circuit diagrams of a system configured in accordance with embodiments of the present technology.

Identical reference numerals have been used, where possible, to designate identical elements that are common to the figures. It is contemplated that elements disclosed in one implementation may be beneficially utilized in other implementations without specific recitation.

DETAILED DESCRIPTION

The present technology is generally directed to multi-frequency controllers for inductive heating and associated systems and methods. In some embodiments, systems associated with the present technology are configured to precisely heat a module via a coil (e.g., an inductive coil) to a target temperature using oscillating, pulsed electrical signals associated with unique frequencies and/or capacitance values. Each unique frequency can correspond to heating the module to a particular depth, relative to an outer surface of the module. For example, a first pulsed electrical signal having a first frequency can heat the module to a first depth, and a second pulsed electrical signal having a second frequency can heat the module to a second depth different than the first depth. As such, individual regions extending along a length of the module can be individually heated by each electrical signal, thereby allowing the module, or more particularly a reactor core of the module, to be precisely heated to the target temperature. In particular, the present technology allows the core to be approximately uniformly heated, such that the temperature difference of individual regions across a diameter of the core is less than about 15 degC., less than about 10 degC., or less than about 5 degC. Furthermore, the present technology can also include one or more thermal sensors in communication with a controller that controls heating of the core via the coil. The thermal sensors can collect temperature measurements of the core or fluid entering, passing through, or exiting the core, and can be used as feedback to adjust the electrical signals being sent to the coil. For example, in some embodiments, a duty cycle of the electrical signals can be adjusted depending on whether the measured temperature is above or below the target temperature.

In the following detailed description, reference is made to the accompanying drawings that form specific embodiments by way of illustration in which the disclosed subject matter can be practiced. However, it should be understood that other embodiments may be utilized, and structural changes may be made without departing from the scope of the disclosed subject matter. Any combination of the following features and elements is contemplated to implement and practice the disclosure.

In the description, common or similar features may be designated by common reference numbers. As used herein, "exemplary" may indicate an example, an implementation, or an aspect, and should not be construed as limiting or as indicating a preference or a preferred implementation.

Figure 1:
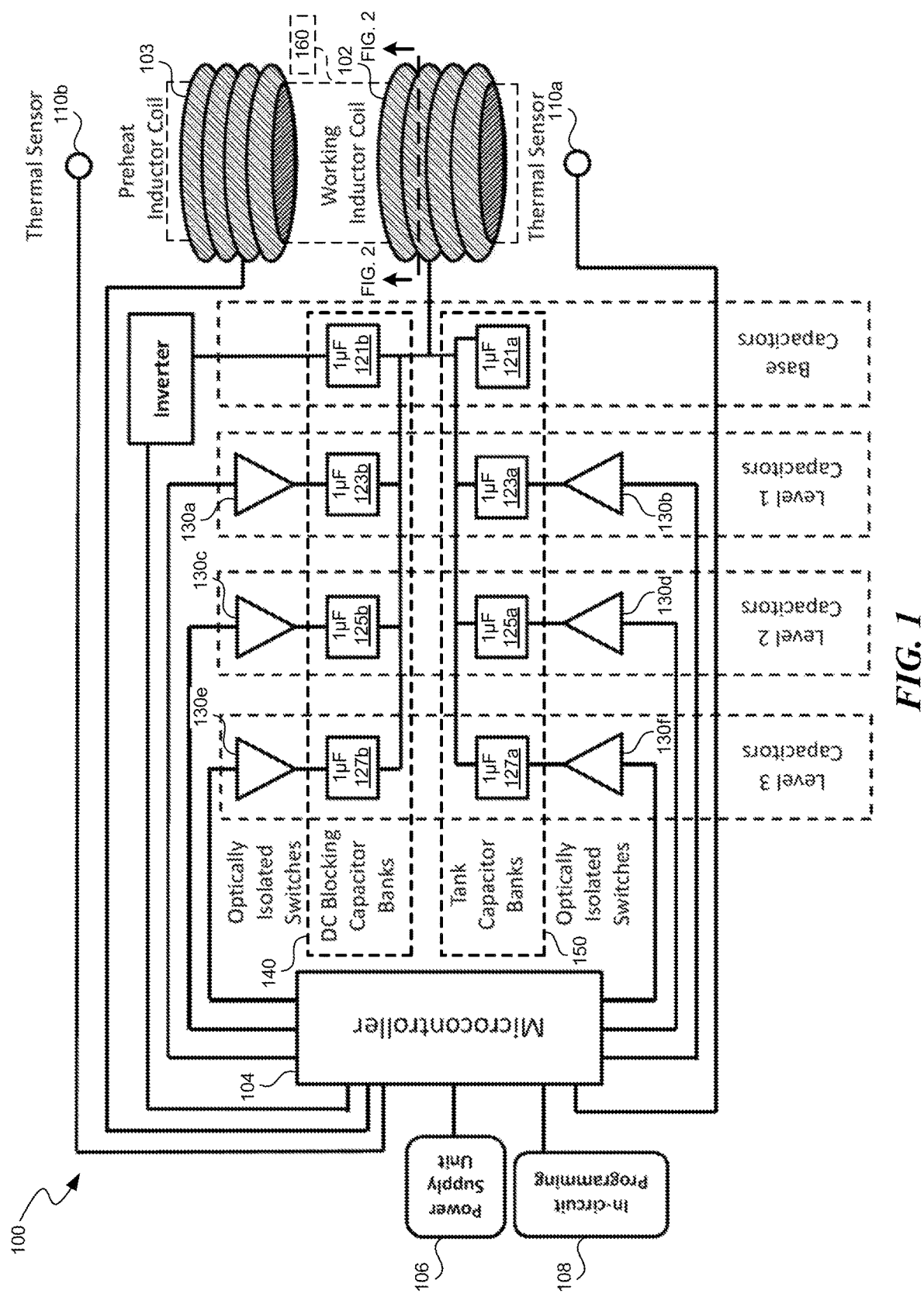
FIG. 1 is a schematic view of a system for inductively heating a module, configured in accordance with embodiments of the present technology.

FIG. 1 is a schematic view of a system 100 for inductively heating a load, configured in accordance with embodiments of the present technology. As shown in the illustrated embodiment, the system 100 includes an inductor coil (e.g., a first coil) 102, a plurality of capacitors configured to electrically connected to the inductor coil 102, and a microcontroller 104 in communication with the inductor coil 102 and plurality of capacitors. The system 100 can further include a power supply unit 106 in communication with the microcontroller 104 and configured to produce pulsed electrical signals to be sent by the microcontroller 104, and in-circuit programming 108 (e.g., instructions) for operating the microcontroller 104. The coil 102 can be positioned around a module 160 that includes a core portion (e.g., a catalytic core portion). The module 160, and thus the core, is configured to receive a fluid, such as a hydrogenated molecule, and cause hydrogen to be released from the hydrogenated molecule to produce a composition including an at least partially dehydrogenated molecule and gaseous hydrogen.

The plurality of capacitors can include one or more base capacitors 121a, 121b (referred to collectively as "base capacitors 121"), a first set of capacitors 123a, 123b (referred to collectively as "first set of capacitors 123"), a second set of capacitors 125a, 125b (referred to collectively as "second set of capacitors 125"), and a third set of capacitors 125a, 125b (referred to collectively as "third set of capacitors 127"). The base set of capacitors 121 can be configured to be always on while the microcontroller 104 is operating to provide at least a minimal amount of current to the coil 102. A portion of the first, second and third sets of capacitors 123, 125, 127 are included in a first bank of capacitors 140 (shown collectively as "DC Blocking Capacitor Bank"), and another portion of the first, second and third set of capacitors are included in a second bank of capacitors 150 (shown collectively as "Tank Capacitor Banks"). Each of the capacitors in the first, second and third sets of capacitors 123, 125, 127 includes a corresponding switch 130a, 130b, 130c, 130d, 130e, 130f (referred to collectively as "switches 130"). The individual switches 130 can be switched on to include the corresponding capacitor in the electrical circuit including the coil 102, or can be switched off to not include the corresponding capacitor in the electrical circuit including the coil 102. The switching of the individual switches 130 is controlled by the microcontroller 104, and can be based, e.g., on the frequency of the electrical signal to be sent to the coil 102. Each of the capacitors 121, 123, 125, 127 includes a particular capacitance value that is or can be added to the electrical circuit including the coil 102. As shown in the illustrated embodiment, the capacitance value is 1 microfarad for each capacitor. In other embodiments, however, these values can be changed depending on the particular application of the system 100.

As shown in the illustrated embodiment, the system 100 can further include one or more thermal sensors 110a, 110b (e.g., temperature measurement devices; referred to collectively as "thermal sensors 110"). The thermal sensors 110 can include a thermocouple, a resistance temperature detector (RTD) and/or a camera (e.g., an infrared thermal imager). The thermal sensors 110 are in electrical communication with the microcontroller, and are positioned adjacent (e.g., directly above, below or to the side of) the module 160. As such, the thermal sensors 110 are positioned to capture an end view of the core of the module 160 and collect temperature measurements of individual regions across a diameter of the core. The measurements can then be stored in memory associated with the microcontroller 124, e.g., as 10-bit words. In some embodiments, the resolution of the infrared imager can be 640×480 pixels. In a preferred embodiment, the resolution is high enough to look at individual channels within the core that are configured to pass a fluid (e.g., the hydrogenated molecule referred to above). The imager can form a virtual image of a temperature profile within the core, and the virtual image can then be quantized and used by the microcontroller 124 to control the amount of heating via the coil 102 by adjusting one or more of the signal delivery parameters of the electrical signals that are sent to the coil. As explained in further detail below with reference to FIG. 3, temperature measurements from the thermal sensors 110 can be used by the microcontroller 104 to adjust the electrical signals sent to the coil 102 to heat the fluid traveling through the core of the module 160.

As shown in the illustrated embodiment, the system 100 can further include another coil (e.g., a second coil) 103. The second coil 103 is positioned upstream of the first coil 102, and is configured to heat the fluid entering the module 160 to the target temperature before the fluid reaches the core of the module 160. The second coil 103 can be in electrical communication with and be controlled by the microcontroller 104. The microcontroller 104 can adjust one or more signal delivery parameters (e.g., frequency, amplitude, duty cycle, etc.) of the electrical signals sent to the second coil 103, based on, e.g., temperature measurements from the thermal sensors 110.

Figure 2:
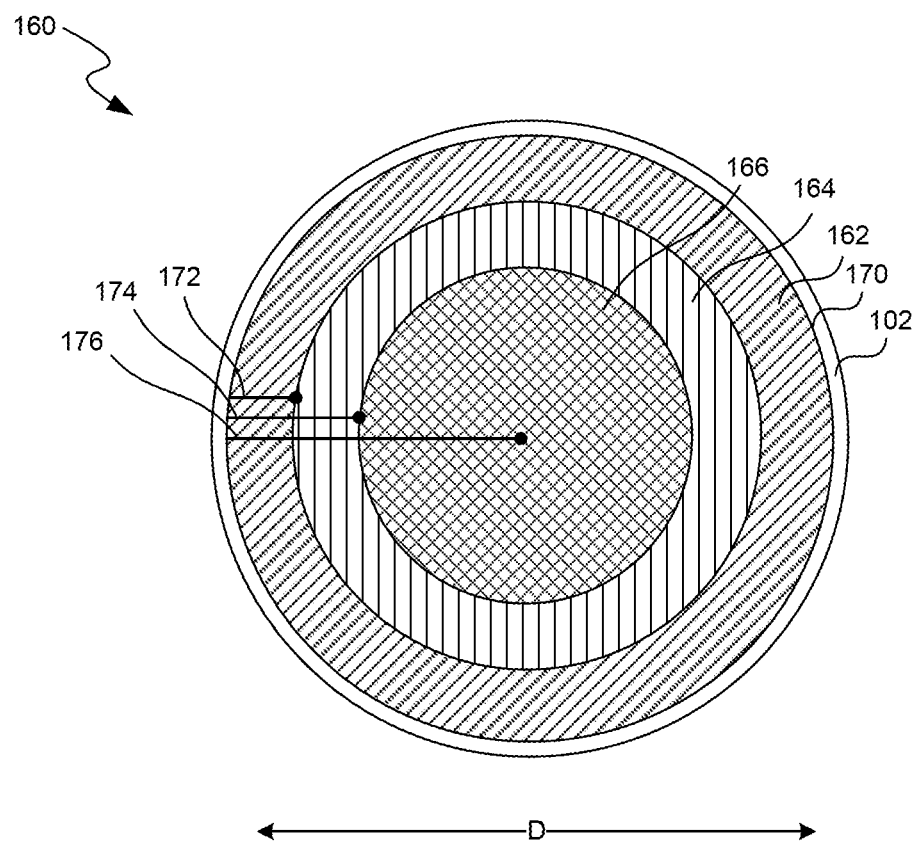
FIG. 2 is an end view of the module shown in FIG. 1, configured in accordance with embodiments of the present technology.

FIG. 2 is an end view of the module 160 and the coil 102 wrapped around the module 160, configured in accordance with embodiments of the present technology. As shown in the illustrated embodiment, the module 160 can include a plurality of regions, such as a first region 162 (e.g., an inner region), a second region 164 (e.g., an intermediate region) surrounded by the first region 162, and a third region 166 (e.g., an outer region) surrounded by the second region 164. The first region 162 extends to a first depth 172 relative to an outer surface 170 of the module 160, the second region 164 extends to a second depth 174 relative to the outer surface 170, and the third region 166 extends to a third depth 176 (i.e., the center of the module). In other embodiments, the module 160 can include additional or fewer regions depending on the particular application of the present technology and/or desired heating control. For illustrative purposes, details of the core of the module have been omitted from FIG. 2. For example, the plurality of individual channels, which are present across a diameter (D) of the core and through which fluid flows through, are not shown in FIG. 2.

In operation, the system 100 can be configured to heat the individual regions 162, 164, 166 of the module 160 based on signal delivery parameters of the pulsed electrical signals sent to the coil 102. For example, a first electrical signal having a first frequency and a first capacitance value can cause the module 160 to be heated to the first depth 172 for a period of time. The capacitance value can be based, e.g., on the particular capacitors of the first, second and/or third sets of capacitors 123, 125, 127 that are switched on (i.e., tuned) and added to the circuit. As another example, a second electrical signal having a second frequency and a second capacitance value can cause the module 160 to be heated to the second depth 174 for a period of time, and a third electrical signal having a third frequency and a third capacitance value can cause the module 160 to be heated to the third depth 176 for a period of time. By altering the signal delivery parameters of the pulsed electrical signals, and interleaving the electrical signals themselves (e.g., interleaving the first, second and third electrical signal), the different individual regions of the core can be individually targeted and heated. By heating the individual regions by induction, the system 100 can heat the core across its entire diameter (D) such that a temperature difference across the diameter of the core is less than a threshold limit (e.g., 15 degC., 10 degC., 5 degC., etc.). The frequencies and/or capacitance values selected for each electrical signal can be predetermined and tied to heating a particular depth of penetration of the module, relative to an outer surface of the module. For example, the table below shows example frequencies and capacitance values associated with particular depths of heating penetration.

| Location | Frequency | DC Blocking Value | Tank Value |
|---|---|---|---|
| First (outer) region | 84 kHz | 4 µF | 4.5 µF |
| Second (intermediate) region | 51 kHz | 8 µF | 12 µF |
| Third (inner) region | 23 kHz | 32 µF | 64 µF |

As shown in the table, the frequency of the electrical signal decreases as the depth of penetration increases. For example, the first, outermost region 162 can be heated using a first frequency, 84 kHz, and a combined capacitance value of 8.5 microfarads, the second, intermediate region 164 can be heated using a second frequency, 51 kHz, and a combined capacitance value of 20 microfarads, and the third, innermost region 166 can be heated using a third frequency, 23 kHz, and a combined capacitance value of 96 microfarads. As described above, these signals can be sent to the coil 102 in an oscillating manner (e.g., the first signal with the first frequency and first capacitance value is sent, then the second signal with the second frequency and second capacitance value is sent, and then the third signal with the third frequency and third capacitance value is sent). In other embodiments, the frequencies and/or capacitance values used can vary from those disclosed in the table above, depending on the particular application of the present technology.

As yet another example, the number of capacitors and/or the capacitance value to be sent to the coil 102 for a particular electrical signal may be individually selected, as opposed to being selected as a set of capacitors. For example, as shown in the table below which includes a system with three capacitors, any combination of the capacitors may be chosen. As such, for three capacitors, 8 different combinations of the capacitors can be selected to send a desired amount of capacitance to the coil 102. This ability for the microcontroller to select capacitance values based on the needed depth of heating penetration, allows the module 160 to be heated across its diameter in a relatively uniform manner.

| Address | Cap1 = 2 µF | Cap2 = 16 µF | Cap3 = 64 µF | Total µF |
|---|---|---|---|---|
| 000 | — | — | — | Base Value (B) |
| 001 | 2 µF | — | — | B + 2 µF |
| 010 | — | 16 µF | — | B + 16 µF |
| 011 | 2 µF | 16 µF | — | B + 18 µF |
| 100 | — | — | 64 µF | B + 64 µF |
| 101 | 2 µF | — | 64 µF | B + 66 µF |
| 110 | — | 16 µF | 64 µF | B + 80 µF |
| 111 | 2 µF | 16 µF | 64 µF | B + 82 µF |

Figure 3:
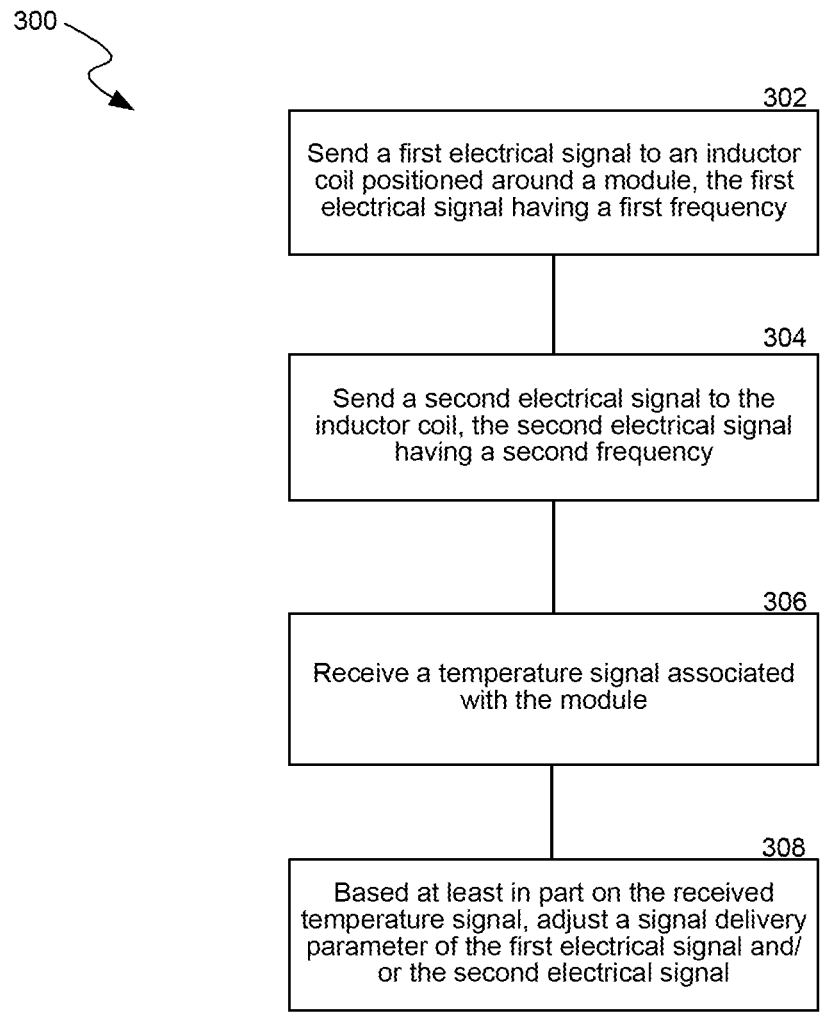
FIG. 3 is a block flow diagram illustrating a method for inductively heating a module, configured in accordance with embodiments of the present technology.
Figure 4A:
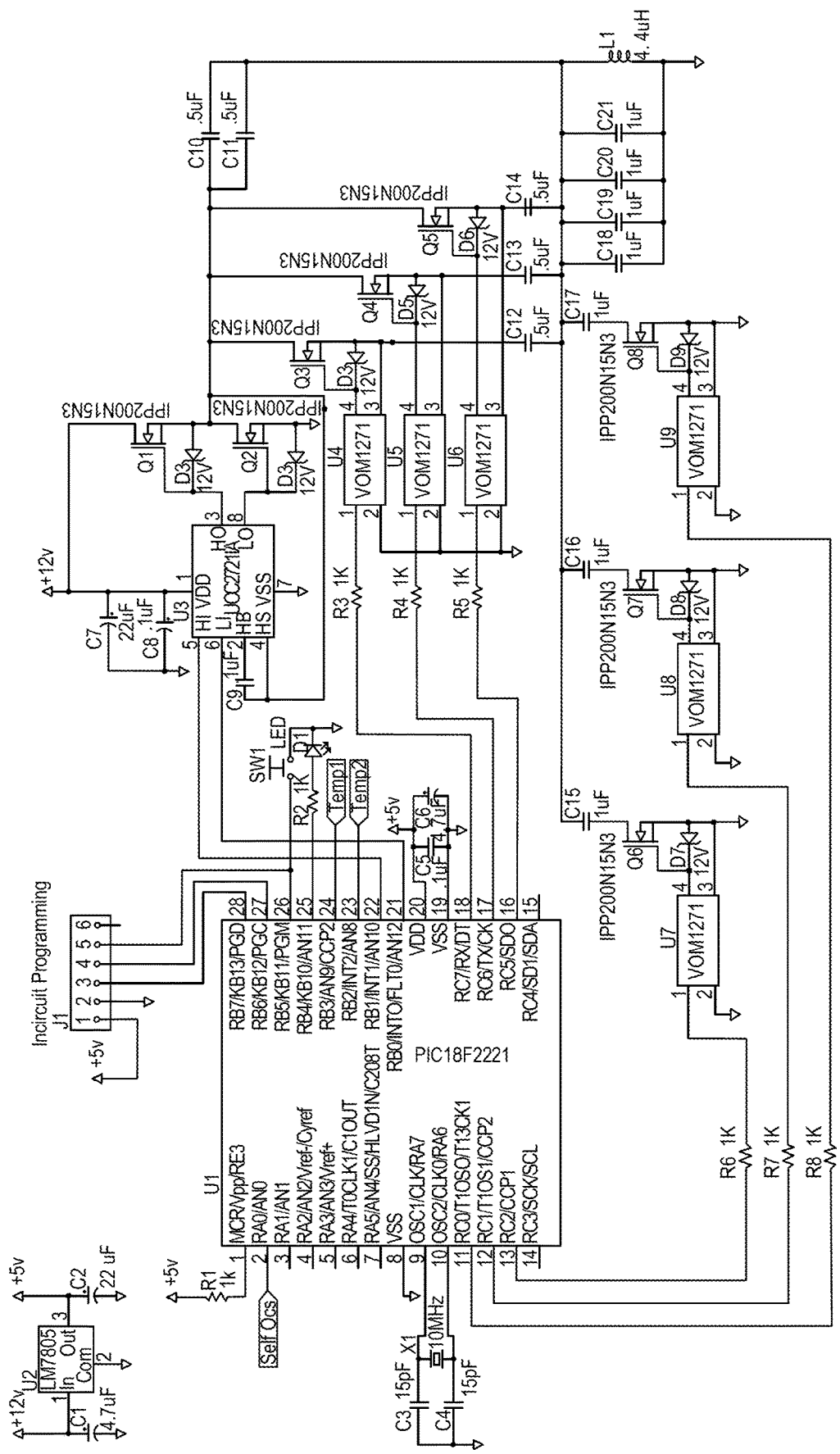

FIG. 3 is a block flow diagram illustrating a method 300 for inductively heating a load, configured in accordance with embodiments of the present technology. Many of the structural features described with reference to the system 100 of FIG. 1 are used to describe the method 300 of FIG. 3. The method 300 includes sending a first electrical signal to the inductor coil 102 positioned around the module 160 (process portion 302). The first electrical signal can be sent from the microcontroller 104, and can include a first set of signal delivery parameters, such as a first frequency, a first capacitance and/or a first duty cycle. The method 300 can further include sending a second electrical signal to the inductor coil 102 (process portion 304). The second electrical signal can be sent from the microcontroller 104, and can include a second set of signal delivery parameters, such as a second frequency, a second capacitance value and/or a second duty cycle. The first and/or second frequencies can be selected from a preset list of frequencies, such as those disclosed in the tables above. Furthermore, the first and second electrical signals can be sent in an interleaving manner, and may include additional electrical signals (e.g., a third electrical signal). Additionally, the electrical signals may be sent in an oscillating manner, in that the signal is being repeatedly sent (e.g., the first signal is sent, followed by the second signal, followed by the first signal, etc.).

The first and second signals can cause at least a portion of the plurality of capacitors to be switched on. The switching of the individual switches 130 may be done via a separate signal sent by the microcontroller 104 to the individual switch. In some embodiments, each electrical signal (e.g., the first electrical signal, the second electrical signal, etc.) may correspond to switching on a set of capacitors. For example, the first signal may cause the first set of capacitors 123 to be switched on, thereby causing the capacitance values associated with the first set of capacitors 123 to be sent to the coil 102. Similarly, the second signal may cause the second set of capacitors 125 to be switched on, and a third signal may cause the third set of capacitors 127 to be switched on. In other embodiments, each signal may correspond to only one of the two capacitors for each set of capacitors shown in FIG. 1. In such an embodiment, only one capacitor is switched on at a time.

The method 300 can further include receiving a temperature signal associated with the module 160 (process portion 306). The received temperature signal can include a temperature measurement of the core, such as a temperature of one of the regions 162, 164, 166, and/or a temperature measurement of the fluid, such as the fluid entering, exiting or passing through the module 160. In some embodiments, the temperature measurement can be a temperature profile of the core. For example, the imager referred to above with respect to FIG. 1, can form a virtual image of a temperature profile within the core, and the virtual image can then be quantized and used by the microcontroller 124, e.g., as feedback to better control temperature of the module 160.

The method 300 can further include adjusting a signal delivery parameter of the first electrical signal and/or the second electrical signal, based on the temperature signal received. The signal delivery parameter being adjusted can include duty cycle. For example, based on the received temperature signal, the microcontroller 104 can adjust a duty cycle of the first electrical signal and/or the second electrical signal depending on whether the received temperature signal is above or below a target temperature. If the received temperature signal is above a target temperature, then the temperature of the region of the module or fluid being measured is too high, and the microcontroller 104 may decrease a duty cycle of the first and/or second electrical signal, thereby causing less dwell time (i.e., less heating time) associated with that particular electrical signal. If the received temperature signal is below a target temperature, then the temperature of the region of the module or fluid being measured is too low, and the microcontroller 104 may increase a duty cycle of the first and/or second electrical signal, thereby causing more dwell time (i.e., more heating time) associated with that particular signal.

In operation, the method 300 may operate according to the following example. First, second, and third electrical signals can be sent from the microcontroller 104 to the coil 102 in an oscillating manner, such that the first, second, and third signals are sequentially and iteratively sent. The first electrical signal can cause the first region 162 to be heated, the second electrical signal can cause the second region 164 to be heated, and the third electrical signal can cause the third region 166 to be heated. The depth of penetration for the first, second, and third electrical signals are based at least in part on their signal delivery parameter values, including the frequency, capacitance and/or duty cycle. A lower frequency and a higher capacitance each generally allow for a greater heating depth of penetration. Given the above operation, the electrical signals cause the module 160 to be heated across its diameter to a relatively uniform temperature. This uniform temperature creates optimal conditions for the fluid (e.g., a hydrogenated vaporized carrier molecule) passing through the module to form a desired product (e.g., released gaseous hydrogen molecule(s) and an at least partially dehydrogenated vaporized carrier molecule). Additional details describing the carrier molecule and processing conditions of the carrier molecule are described in U.S. patent application entitled SYSTEMS FOR REMOVING HYDROGEN FROM REGENERABLE LIQUID CARRIERS AND ASSOCIATED METHODS, and filed on May 29, 2018, the disclosure of which is incorporated herein by reference in its entirety. Notably, the release of hydrogen from the hydrogenated vaporized carrier is an endothermic reaction that absorbs heat from the core and thus causes the temperature of the particular region of the core to decrease. The system, therefore, includes devices for measuring temperature of the individual regions, which can determine if a region is below a target temperature and send a temperature signal to the microcontroller 104 indicating such. The microcontroller 104 can respond to the temperature signal and bring the temperature closer toward the target temperature by adjusting one or more of the signal delivery parameters, such as the duty cycle. With each oscillating cycle, temperature measurements of each region can be continually received by the microcontroller 104 and used to ensure the temperature of the core and/or fluid is at or near the target temperature. A similar process to that described above for adjusting the electrical signal sent to the coil 102 can be performed to adjust the electrical signal sent to the second coil 103 to heat the fluid to the target temperature prior to it entering the core of the module 160.

FIGS. 4A-4D are schematic wiring diagrams of the system shown in FIG. 1. As shown in the illustrated embodiments, the circuit includes a power supply unit (LM7805 U2) that includes a +12V DC input and a +5V output. The +12V input comes in on pin 1, which is isolated from ground by a 4.7 µF capacitor (C1) and can provide ripple suppression. Pin 2 is grounded and pin 3 is the +5V output, also isolated from ground with a 22 µF capacitor (C2). The circuit also includes a 10 Mhz crystal oscillator (X1), which acts as an external time source. Both the pins 1 and 2 are isolated from ground by a pair of 15 µF capacitors (C3 and C4), which act as loads for the crystal oscillator. As shown in the illustrated embodiment, they are connected to pins 8 and 9 on a microcontroller.

The microcontroller (U1) is a PIC18F2221 with 28 pins. In some embodiments, the microcontroller can require a +5V DC to operate, and can be connected to pin 1 with a 1000 ohm resistor (R1) to protect the microcontroller (U1) from overvoltage, e.g., from the VDD. The microcontroller (U1) uses an external clock source (X1) to control timing of the electrical signals being sent therefrom. The external clock source connects to pin 8 (OSC1) and pin 9 (OSC2). Pin 19 is ground referenced for logic and I/O, and Pin 20 is a +5V DC supply for logic and I/O pins. Between pin 19 and pin 20 are a 1 µF capacitor (C5) and a 4.7 µF capacitor (C6) in parallel. Output pins 21 (RB0) and 22 (RB1) are connected to pin 6 (LI) and pin 5 (HI) of an inverter (U3), respectively, which provide the LOW side signal and the HIGH side signal to the inverter (U3), respectively.

The inverter (U3) is comprised of a MOSFET driver, an 8-pin SOIC (UCC27211A). Input signals for the inverter come in on pin 6 (LI) and pin 5 (HI), and output signals for the inverter feed into to MOSFETs Q1 and Q2 using pin 3 (HO) and pin 8 (LO). Between pin 2 (HB) and pin 4 (HS) is a 0.1 µF capacitor (C9), which can be used as a bootstrap capacitor. On pin 7 is VSS ground, which is shared by the bottom pad of the IC for heat dissipation. Pin 1 is VDD connected to +12V DC. Connected to this trace are capacitors C7 (22 µF) and C8 (0.1 µF) in parallel, which are connected to ground for decoupling purposes. The inverter (U3) takes the HIGH side signal input from the microcontroller (U1) on pin 5 (HI) and outputs on pin 3 (HO) to the Gate of the HIGH side MOSFET Q1. The inverter (U3) takes the LOW side signal input from the microcontroller (U1) on pin 6 (LI) and outputs on pin 8 (LO) to the Gate of the LOW side MOSFET Q2. The inverter (U3) also has an internal circuitry to turn off the MOSFETs Q1 and Q2 when the signal drops, thus preventing them from staying on in an uncontrolled manner. Pin 4 (HS) is connected to an inverter bus to the source of the HIGH side MOSFET Q1.

The MOSFETs Q1 and Q2 are N-type MOSFETs (IPP200N15N3). They are robust enough to withstand high-frequency switching, current demands, and heating coefficient. In a preferred embodiment, the MOSFETs Q1 and Q2 are not on at the same time. Current flows through the MOSFET Q1 through a coil (L1) to ground, and as peak current is reached, the MOSFET Q2 turns on and reverses the current flows. The MOSFET Q1 is connected to the HIGH side output (pin 3) of the MOSFET driver (U3) via the Gate pin. It is referenced to +12V, connected to the Drain pin. The Source pin is connected to the inverter bus. The MOSFET Q2 is connected to the LOW side output (pin 8) of the MOSFET driver (U3) via the Gate pin. It is referenced to ground, connected to the Source pin. The Drain pin is connected to the inverter bus. Zener diodes D2 and D3 are across the Source and Drain pins on the MOSFETS Q1 and Q2 to protect the Gate from overvoltage. The inverter bus is connected to a switchable DC blocking capacitor bank. The DC blocking bank is comprised of two 0.5 µF capacitors (C10 and C11), which is the base capacitance value.

The circuit further includes a Tank circuit, which is comprised of a 4.4 µH working coil (L1) and a switchable Tank capacitor bank. As shown in the illustrated embodiment, the Tank capacitor bank is comprised of four 1 µF capacitors (C18, C19, C20, and C21), which is the base capacitance value for the Tank circuit. This part of the circuit tunes to different frequencies. For example, based in part on the microcontroller (U1), the inverter (U3) can change the frequency and the capacitors can be switched in or out of the DC blocking bank and the Tank bank of capacitors.

The circuit includes optically isolated switch units (U4, U5, U6, U7, U8, and U9), which are used to add or remove capacitance values to the DC blocking and Tank capacitor banks. Optical Isolation can prevent back EMF (Counter Electromotive Force) from damaging the microcontroller (U1). Each optionally isolated switch unit (VOM1271) is comprised of a signal trace that goes from pin 1 to an I/O port on the microcontroller (U1) through a 1000 ohm in-series resistor (R3, R4, R5, R6, R7, and R8). Pin 2 goes to ground, and Pins 3 and 4 go to the anode and cathode side of a Zener diode (D4, D5, D6, D7, D8, and, D9), respectively. Pin 4 also goes to the Gate pin of a MOSFET (Q3, Q4, Q5, Q6, Q7, and Q8). The Source pin of a MOSFET connects to the anode side of a Zener diode, which is connected to ground. When a switch unit is actuated, the Drain will connect an additional bank capacitor (C12, C13, and C14) into the DC blocking bank (010 and C11), or connect an additional bank capacitor (C15, C16, and C17) into the Tank bank (C18, C19, C20 and C21).

The Drain pins of the MOSFETs Q3, Q4, and Q5 are connected to the inverter bus. When they are digitally addressed by the microcontroller (U1) using pins 16 (RC5), 17(RC6), and 18(RC7), additional values of capacitance (C12, C13, and C14, each with 0.5 µF) can be selected to tune the DC blocking capacitor bank (C10 and C11) for the required frequency.

The circuit includes a middle bus, which is on the inside of the DC blocking capacitor bank (C10 and C11) and connects to the inside leg of the Tank bank (C18, C19, C20, and C21) as well as the inside leg of the working coil (L1). The other side of the working coil (L1) goes to the ground return bus.

As shown in the illustrated embodiment, the Drain pins of the MOSFETs Q6, Q7, and Q8 are connected to the middle bus, each through a capacitor that is being added in parallel to the Tank bank (C18, C19, C20, and C21). When they are digitally addressed by the microcontroller (U1) using pins 11 (RC0), 12 (RC1), and 13 (RC2), additional values of capacitance (C15, C16, and C17, each with 1 µF) can be selected to tune the Tank capacitor bank (C18, C19, C20 and C21) for the required frequency. The other side of these capacitors connects to the ground return bus.

The circuit can further include a LED (D1). The anode of the LED (D1) is connected to pin 25 (RB4) of the microcontroller (U1) via a 1000 ohm resistor (R2). The cathode of the LED (D1) is connected to a normally open switch (SW1). The other side of the switch (SW1) is connected to pin 26 (RB5) of the microcontroller (U1).

The circuit can further include a 6 pin connector (J1) for In Circuit Serial Programming (ICSP) of the microcontroller (U1). Pin 1 is for +5V; pin 2 goes to ground; pin 3 goes to pin 28 (RB7) of the microcontroller (U1); pin 4 goes to pin 27 (RB6) of the microcontroller (U1); pin 5 goes to pin 26 (RB5) of the microcontroller (U1); and pin 6 is keyed to insure proper insertion. RB5 is the ICSP programming enable pin; RB6 is the ICSP programming clock pin; and RB7 is the ICSP programming data pin. Pin 23 (RB2) and pin 24 (RB3) are analog inputs connected to thermal sensors.

Additional details of the reactor core and heating thereof are described in U.S. patent application Ser. No. 15/826,590, entitled INDUCTIVELY HEATED MICROCHANNEL REACTOR, and filed on Nov. 29, 2016, the disclosure of which is incorporated herein by reference in its entirety.

From the foregoing, it will be appreciated that specific embodiments of the invention have been described herein for purposes of illustration, but that various modifications may be made without deviating from the scope of the invention. Accordingly, the invention is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described. Other implementations, enhancements, and variations can be made based on what is described and illustrated in this patent document.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

Some embodiments implement functions in two or more specific interconnected hardware modules or devices with related control and data signals communicated between and through the modules, or as portions of an application-specific integrated circuit. Thus, the example system is applicable to software, firmware, and hardware implementations.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

While the foregoing is directed to implementations of the present disclosure, other and further implementations of the disclosure may be devised without departing from the basic scope thereof, and the scope thereof is determined by the claims that follow.

We claim:

1. A system for inductively heating a load, the system comprising:
   an inductor coil configured to heat a fluid flowing through a module, the module including a core;
   a thermal sensor configured to sense a temperature associated with the core or the fluid;
   a first set of capacitors configured to be operably coupled to the inductor coil;

a second set of capacitors configured to be operably coupled to the inductor coil;

a microcontroller communicatively coupled to the thermal sensor and the first and second sets of capacitors, and a plurality of switches configured to communicatively couple the first and second sets of capacitors to the microcontroller, respectively, wherein the microcontroller is configured to:

send interleaving electrical signals to the inductor coil, the electrical signals including a first electrical signal having a first frequency and a first duty cycle, and a second electrical signal having a second frequency, different than the first frequency, and a second duty cycle, wherein the first and second frequencies are selected from a plurality of predetermined frequencies, and wherein the first electrical signal causes the first set of capacitors to be electrically connected to the inductor coil, and the second electrical signal causes the second set of capacitors to be electrically connected to the inductor coil;

receive a temperature signal including the temperature associated with the core or the fluid; and adjust, based at least in part on the received temperature signal, at least one of the first or second duty cycles.

2. The system of claim 1 wherein the module includes a first region and a second region surrounding the first region, and wherein the first frequency is associated with heating only the first region, and the second frequency is associated with heating only the second region.

3. The system of claim 1 wherein each of the predetermined frequencies has a predetermined correlation with a capacitance value.

4. The system of claim 1 wherein each of the predetermined frequencies affects different heating depths relative to an outer surface of the module.

5. The system of claim 1 wherein the first electrical signal causes the module to be heated to a first depth relative to an outer surface of the module, and the second electrical signal causes the module to be heated to a second depth relative to the outer surface, the second depth being greater than the first depth.

6. The system of claim 1, the microcontroller further configured to:

increase, in response to the temperature signal with the temperature associated with the core or the fluid below a target temperature, at least one of the first or second duty cycles, or decrease, in response to the temperature signal with the temperature associated with the core or the fluid above the target temperature, at least one of the first or second duty cycles.

7. The system of claim 1, further comprising:

a third set of capacitors configured to be operably coupled to the inductor coil;

wherein the microcontroller is further communicatively coupled to the third set of capacitors, wherein the electrical signals further include a third electrical signal having a third frequency, different than the first and second frequencies, and a third duty cycle;

wherein the third frequency is selected from the plurality of predetermined frequencies, and wherein the third electrical signal causes the third set of capacitors to be electrically connected to the inductor coil.

8. The system of claim 1 wherein the first and second sets of capacitors are electrically connected to the inductor coil by switching individual switches of the plurality of switches associated with corresponding capacitors of the first and second sets of capacitors.

9. The system of claim 1 wherein the inductor coil is a first inductor coil wrapped around a first portion of the module, the system further comprising a second inductor coil wrapped a second portion of the module different from the first portion, the second inductor coil being connected to the microcontroller.

10. The system of claim 1 wherein the temperature is associated with the temperature of the fluid at an inlet of the module.

11. The system of claim 10 wherein the thermal sensor is a first thermal sensor, and wherein the temperature signal is a first temperature signal and the temperature is a first temperature; the system further comprising a second thermal sensor configured to sense a second temperature of the fluid associated with an outlet of the module, wherein adjusting the at least one of the first or second duty cycles is further based on a second temperature signal including the second temperature received via the second thermal sensor.

12. The system of claim 1 further comprising a base set of capacitors electrically connected to the inductor coil.

13. The system of claim 1, further comprising a power supply connected to the microcontroller and configured to generate the electrical signals sent to the inductor coil.

14. The system of claim 1 wherein a difference in temperature across a diameter of the module is less than about 10 degC.

15. The system of claim 1 wherein first set of capacitors comprise a first capacitance value, and the second set of capacitors comprise a second capacitance value different than the first capacitance value.

16. The system of claim 1 wherein adjusting at least one of the first or second duty cycles is done to maintain a substantially uniform temperature of the fluid.

17. A method for inductively heating a load, the method comprising:

sending interleaving electrical signals to an inductor coil wrapped around a module, the electrical signals including a first electrical signal having a first duty cycle and a second electrical signal having a second duty cycle, wherein— the first electrical signal causes a first set of capacitors to be electrically connected to the inductor coil, and the module to be heated to a first depth relative to an outer surface of the module, and the second electrical signal causes a second set of capacitors, different from the first set of capacitors, to be electrically connected to the inductor coil, and the module to be heated to a second depth relative to the outer surface, the second depth being different than the first depth;

receiving a temperature signal from a thermal sensor, the temperature signal including a temperature of at least one of the module or a fluid entering or exiting the module; and adjusting, based at least in part on the received temperature signal, a signal delivery parameter of at least one of the first or second electrical signals.

18. The method of claim 17 wherein the first electrical signal has a first frequency and the second electrical signal has a second frequency different than the first frequency, wherein the first and second frequencies are selected from a plurality of predetermined frequencies.

19. The method of claim 17 wherein the adjusted signal delivery parameter includes duty cycle, and the method further comprising:
   increasing, in response to the temperature signal with the temperature below a target temperature, at least one of the first or second duty cycles, or
   decreasing, in response to the temperature signal with the temperature above the target temperature, at least one of the first or second duty cycles.

20. The method of claim 17 wherein the first and second sets of capacitors are electrically connected to the inductor coil by switching individual switches associated with corresponding capacitors of the first and second sets of capacitors.

* * * * *